United States Patent [19]

Boyd

[11] Patent Number: 4,462,488
[45] Date of Patent: Jul. 31, 1984

[54] BICYCLE BRAKE

[76] Inventor: Winnett Boyd, 32 Restwell Crescent, Willowdale, Ontario, Canada, M2K 2A3

[21] Appl. No.: 302,537

[22] Filed: Sep. 16, 1981

Related U.S. Application Data

[63] Continuation-in-part of Ser. No. 078,249, Sep. 24, 1979, abandoned.

[51] Int. Cl.³ .............................................. B62L 5/00
[52] U.S. Cl. ...................................... 192/5; 74/594.2; 188/24.21
[58] Field of Search ................. 192/5, 6 R, 6 A, 6 B, 192/12 BA; 188/24.17, 24.19, 24.21; 280/249, 250, 264; 74/594.1, 594.2

[56] References Cited

U.S. PATENT DOCUMENTS

| | | |
|---|---|---|
| 3,831,716 | 8/1974 | Orozco . |
| 3,884,334 | 6/1975 | Mack . |
| 4,134,481 | 1/1979 | Calderazzo . |
| 4,199,046 | 4/1980 | Boyd ....................... 192/5 |
| 4,261,449 | 4/1981 | Foster ...................... 192/5 |

FOREIGN PATENT DOCUMENTS

| | | | |
|---|---|---|---|
| 455428 | 3/1949 | Canada .................... | 188/24.21 |
| 1028004 | 2/1953 | France . | |
| 447991 | 5/1949 | Italy . | |
| 454253 | 4/1950 | Italy ........................ | 188/24.17 |

*Primary Examiner*—George H. Krizmanich
*Attorney, Agent, or Firm*—Ridout & Maybee

[57] ABSTRACT

A bicycle braking system incorporates a pedal crankshaft operated brake actuator, a lost motion connection in the chain drive to the rear wheel of the bicycle, the lost motion being taken up by a highly progressive spring of sufficient strength to require a significant proportion of normal pedalling torque to overcome its action, and a brake incorporating a resilient stirrup supported at three points distributed around the rim of the rear wheel of the bicycle, the stirrup arms being subjected to a wedging action upon actuation of the brake causing brake shoes mounted on the stirrup to grip the rim of the wheel with a caliper action.

16 Claims, 11 Drawing Figures

BICYCLE BRAKE

REFERENCE TO RELATED APPLICATIONS

This application is a continuation in part of applicant's earlier filed copending application, Ser. No. 78,249 filed Sept. 24, 1979 and now abandoned.

FIELD OF THE INVENTION

This invention relates to pedal-propelled vehicles such as bicycles and specifically to single speed, in-hub multi-speed and derailleur multi-speed bicycles that are equipped with back-pedalling brakes that are activated by a device or actuator associated with the pedal crank shaft. Although the invention is also applicable to pedal propelled vehicles having more than two wheels, e.g. tricycles, it will for convenience hereinafter be explained and described in relation to bicycles which are by far the commonest form of such vehicles.

REVIEW OF THE PRIOR ART

Bicycle brakes are generally of two types, those that are hand operated and those that are foot operated. The most usual foot operated type is generally known as a "coaster" or back-pedalling brake. The braking mechanism of the conventional type of coaster brake is contained in the hub of the rear wheel of the bicycle and the operating force is transmitted by the same chain that is used for propelling the bicycle. The means of operating such a coaster brake is by back-pedalling, the reverse torque from the pedals being carried to the rear wheel via a tension force in the lower strand of the chain. The braking mechanism for a hand operated brake may be either a caliper arrangement which presses on the opposite flat sides of the rim of the wheel, favoured because it permits easy removal and replacement of the wheel without disturbing the brake adjustment, or less commonly a drum and shoe brake housed in the hub of the wheel or a disc brake. Other and less satisfactory braking mechanisms have been used in the past for hand operated brakes, such as the simple "spoon" device that presses on the outside of the tire and the "stirrup" device that presses on the inside surface of the rim. That latter although once widely used is unsuitable for use with most modern wheel rims, and also obstructs easy removal of the wheel.

Both hand brakes and coaster brakes have disadvantages. The main disadvantage of the hand brake is the manual force required to apply it. This reduces the sensitivity of the hand for steering the bicycle, especially when one hand is removed from the handle bars. It also limits the force with which the actual friction pads may be applied against the wheel, thus favouring the employment of materials with a high coefficient of friction. Such materials generally have a poor performance when wet; this drastically reduces braking efficiency in wet weather.

The main disadvantage of the conventional coaster brake is that it becomes inoperative if the main drive chain accidentally breaks or slips off either the pedal, or rear wheel sprocket, whilst it cannot be applied to bicycles equipped with derailleur or similar change-speed gears in which the lower strand of the driving chain cannot be used to transmit any tension force.

It has many times been proposed, in order to overcome the problem, to associate a one way clutch mechanism with the pedal crankshaft, by means of which the back-pedalling effort may be applied to a brake actuator lever and thence to a brake mechanism which may be of any of the types customarily operated by a hand brake lever.

One disadvantage of most such proposals and inventions to date is that the brake will lock the wheel when the bicycle has been brought to a halt while the rider is still exerting a back-pedalling torque on the pedal crankshaft. Whilst riders can be taught to avoid this wheel locking by such a brake by reducing the back-pedalling torque just prior to the bicycle coming to a halt, just as an automobile driver can avoid an uncomfortably abrupt stop by reducing the force exerted on the brake pedal just prior to the vehicle coming to a halt, this disadvantage of such a bicycle braking arrangement could be eliminated were there a device preventing brake lock-up.

The reason why the wheel of a bicycle that is equipped with a back-pedalling brake that is actuated by the pedal crankshaft is locked by the brake when the bicycle is brought to a halt as described above is that the top strand of the bicycle chain is always either taut as in single, 3-and 6-speed bicycles or is kept taut by the spring loaded derailleur device of a 5-, 10- or 15-speed bicycle even when the rider is back-pedalling to apply the brake. After such a halt, the brake is in the applied position. This prevents the bicycle wheel from rotating, and since the top strand of the chain is taut, the chain wheel and pedal crank are also prevented from rotating in the sense of direction that will release the brake actuator clutch on the pedal crankshaft and thereby release the brake. In short, the bicycle wheel is locked. This problem of lock-up in bicycles equipped with a crankshaft operated back-pedal brake is considered in detail in U.S. Pat. No. 4,134,481, issued on Jan. 16, 1979 to Franklin J. Calderazzo, as is another problem with such bicycles, which is that wheeling the bicycle rearward can also generate a lock up condition. This patent also contains an extensive review of other prior art patents in this field, but is more pertinent than those other patents in that it not only recognizes the lock-up problem but also provides a means for releasing lock-up when it occurs. Unfortunately this solution, like a similar arrangement of earlier date disclosed in French Pat. No. 1,038,004, issued Feb. 25, 1953, is not of general application to crankshaft operated back-pedal brakes but depends upon use of a brake actuating mechanism of the type proposed by the inventor, which in the case of Calderazzo is considerably more complex than that proposed for example by the present inventor in his U.S. Pat. No. 4,199,040 issued Apr. 22, 1980, whilst the French patent relies on proper positioning of the pedals. There therefore remains a need for means for preventing lock-up which will be of general application to bicycles with crankshaft operated brake actuators. A further problem with the Calderazzo device is that whilst it is effective in releasing lock-up when it occurs, it does not actually prevent it from happening. Thus if a bicycle equipped with the Calderazzo device is brought to a halt with its brakes applied, the brakes can only be released by withdrawing pawls from engagement with a ratchet wheel comprised by the actuator, resulting in an undesirable sudden abrupt release of the brakes as the pawls disengage before the actuator has returned to its brake releasing position, instead of the normal and expected gradual release. Moreover, whilst Calderazzo suggests that his arrangement overcomes the problem of lock-up on rearward wheeling of the bicycle, he does not fully explain how this is achieved, since he states at column 13, lines 9-12 that "It is to be understood that such backward wheeling or coasting of the bicycle can occur only if the springs 48 become stretched ... ", but no explanation is given as to how these springs can be stretched other than by forward pressure on the pedals, which cannot be used whilst the bicycle is being wheeled. Even though the springs are explained to be provided only for the purpose of assuring there is no apparent source of any counteracting force other than the pedals.

An arrangement which is effective in preventing lock-up is disclosed in Italian Pat. No. 447,991 issued May 4, 1949 to Lombardi, and subsequently in U.S. Pat. No. 3,884,334 issued June 10, 1975 to Mack. In these patents, lost motion is introduced into the chain drive by means of pin and slot connections between the hub and rim of the chain wheel, so that the pedal crankshaft may be moved forward through a sufficient distance to provide normal release of the brake, without corresponding forward movement of the chain. A spring is provided to take up the lost motion upon back-pedalling. Mack recommends that only a light spring is employed, and whilst Lombardi does not discuss spring strength, his arrangement is clearly such as to permit only a very small spring to be utilized. Whilst these two arrangements will be effective in preventing lock-up, the lost motion necessary for their operation will tend to result in a jerk as forward pedalling pressure is applied and the lost motion is taken up against the spring. Such a jerk not only places undesirable stresses on the mechanism but provides a roughness of operation which detracts from pleasure of riding such a bicycle.

A further problem associated with pedal crankshaft operated brake actuators is that of providing a suitable brake mechanism. An advantage of such an actuator is that it makes available a much greater actuating force. This cannot be fully exploited using conventional cable operated caliper brake mechanisms, whilst drum or disc brakes require special hub constructions. In U.S. Pat. No. 3,831,716 issued Aug. 27, 1974 to Orozco, the brake mechanism used is the old-fashioned stirrup type brake, which has the advantage of simplicity and robustness, but also the disadvantage of indifferent performance, particularly in wet conditions, incompatibility with many modern wheel rims, and high sensitivity to any ovality of the wheel. This latter problem is no doubt the reason for Orozco including a spring link in his brake actuator so as to provide smoother actuation, but this link also aggravates the lock-up problem already discussed since it increases the forward pedal movement required to release the brake, the effect being that the spring holds on the rear brake whilst the rider endeavours to pedal the bicycle forward to release the brake.

To the best of the present applicant's knowledge, none of the prior art proposals for pedal crankshaft operated bicycle brakes, other than the conventional coaster brake, has met with substantial commercial acceptance, and this is believed to be because no such proposal has met what are believed to be the essential requirements for commercial acceptability of such a brake into a braking system of a bicycle. These requirements are seen as being (a) applicability to a wide range of existing bicycle types without major modification of other components,
(b) structure at least as robust and durable as that of existing brake systems,
(c) cheap to produce and assemble,
(d) free of undesirable side effects such as brake lock-up,
(e) smooth and unobstructive in operation,
(f) easy to maintain, and
(g) providing significant overall advantages as compared with established braking systems.

SUMMARY OF THE INVENTION

The object of the present invention is to provide a pedal crankshaft operated brake system for bicycles which does not rely on the drive train for transmitting braking forces and which is capable of meeting the above requirements.

The present invention provides a system for crankshaft operated back-pedal brake actuation for bicycles of the kind in which the brake actuator and crankshaft, once coupled at the commencement of a brake application, move conjointly from a brake releasing to a brake engaging position, and conjointly back to a brake releasing position at the end of a braking operation but which can overcome lock-up problems, including in some embodiments those due to rearward wheeling of the bicycle, without impairing smoothness of operation. Moreover, the invention can be implemented with the minimum of modifications to standard parts utilized in common types of bicycle other than the rear brake mechanism.

I have identified certain main functional requirements of such a system beyond those widely considered in the prior art. Firstly, whilst lost motion means in the drive train are necessary to prevent lock-up during braking, the amount of lost motion required should be reduced to a minimum and the bias taking up the lost motion should be sufficiently progressive to avoid any significant jerk when the lost motion is taken up during forward pedalling. This requires a clutch mechanism which reliably disengages with a minimum of forward pedal crankshaft motion, and a suitably calibrated and fairly powerful bias spring. Secondly, the brake mechanism itself should have improved performance compared with existing rim brakes, although a rim brake rather than a hub brake is preferred for reasons already discussed. Thirdly, the problem of lock-up due to rearward wheeling of the bicycle can be rendered manageable if some small degree of rotation of the braked wheel is possible even with the brake fully applied. This implies some degree of peripheral float of the brake pads or shoes tangential to the circumference of the braked wheel.

According to a first aspect of the invention, a bicycle includes a pedal crankshaft, a chain drive connecting the pedal crankshaft to a rear wheel, a back pedal brake system of the type comprising a brake, a progressive brake actuator connected to the brake and means establishing an operative coupling between the pedal crankshaft and the brake actuator, bidirectional lost motion means incorporated into the chain drive independent of said coupling means, the degree of lost motion being such as to allow sufficient forward motion of the crankshaft independent of the rear wheel to permit full and normal release of the brake whilst maintaining establishment of said coupling, and means biasing the lost motion means to a condition in which the rearward lost motion is taken up and said forward lost motion is available, said biasing means being a spring providing a highly progressive bias as said forward lost motion is taken up, the forward torque required to be applied to the pedal crankshaft fully to take up said bias being a substantial proportion of normal pedalling torque and substantially greater than that required to commence taking up said bias. The use of a biasing spring of such characteristics enables smoothness of operation to be retained despite the presence of the lost motion in the chain drive, yet still overcomes the lock-up problem since the brakes can be released merely by the application of a proportion of normal pedalling torque. It is easiest to obtain smooth operation if the amount of lost motion required to provide release of the brake is minimized. The lost motion requirement is determined by two factors, the angular motion required to operate the clutch mechanism in the brake operator and the angular motion required actually to release the brake. The former requirement may be minimized by utilizing an arragement such as that described in my U.S. Pat. No. 4,199,046 issued Apr. 22, 1980, whilst the latter requirement may be minimized by adopting a brake mechanism which avoids unnecessary lost motion, such as that occurring due to cable stretch in conventional cable operated caliper brakes, or in devices such as the spring shown in the Orozco U.S. Pat. No. 3,831,716, which is provided to prevent overstressing of the brake mechanism. In order to dispense with such sources of lost motion, the brake mechanism used must be robust enough to withstand the stresses which can be applied by a crankshaft operated actuator during panic stops.

According to a second aspect of the invention, a rim brake of the clasp type has a stirrup with stirrup arms, brake shoes carried by the stirrup arms, and guides for the stirrup arms, wherein the stirrup arms are resiliently deflectable towards one another in the plane of the stirrup, and the guides and arms are in wedging engagement whereby to translate radial movements of the stirrup relative to the rim of a wheel to which the brake is applied into caliper movements of the stirrup arms such that outward movement of the stirrup relative to the guides from a rest position results in deflection of the arms towards one another, and resilient return movement of the arms away from one another results in radially inward movement of the stirrup to said rest position, the brake shoes being mounted on the arms to clasp opposite sides of the rim between them upon deflection of the arms towards one another. Preferably the resilient deflectability of the stirrup arms in the plane of the stirrup is provided by forming the stirrup in one piece from resilient strip material having its major cross-sectional dimension perpendicular to the plane of the stirrup. Preferably also the guides for the stirrup arms permit limited displacement of the stirrup in a direction substantially tangential to the wheel rim.

Further features of the invention will become apparent from the following description of preferred embodiments thereof with reference to the accompanying drawings.

DESCRIPTION OF THE PREFERRED EMBODIMENT

Figure 1:
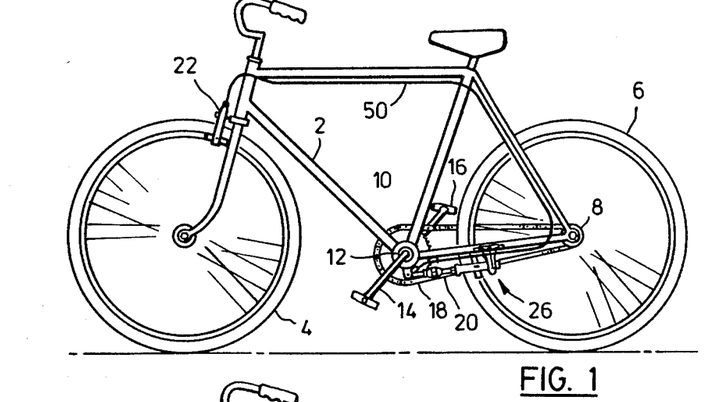
FIG. 1 is a side elevation of a man's bicycle.
Figure 2:
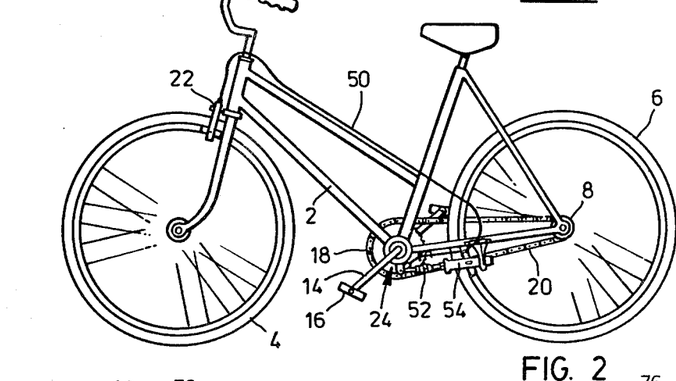
FIG. 2 is a side elevation of a woman's bicycle.

Referring to FIGS. 1 and 2, there are shown exemplary forms of bicycle for a man and for a woman, respectively, equipped with a braking system in accordance with the present invention. The only differences between these bicycles are those customary between men's and women's bicycles, and for the purposes of further description no differentiation will be made, the description and the details shown in the remaining figures of the drawings being equally applicable to both. With the exception of features of the pedal crankshaft and its housing, the chain wheel, the brake actuating system and the rear wheel brake, all described later, each bicycle may be wholly conventional, comprising a frame 2, with handlebars, forks and saddle, a front wheel 4, a rear wheel 6, a rear hub 8 incorporating a rear chain sprocket, a freewheel mechanism and optionally a multi-speed epicyclic gear system of any conventional design, a pedal crankshaft 10 journalled in a crankshaft housing or bottom bracket 12 in the frame 2, pedal cranks 14 carrying pedals 16, a front chain wheel 18 and a chain 20. A derailleur multi-speed gear system (not shown) may be incorporated if desired in place of or in addition to an in-hub gear system, in which case multiple front chain wheels and/or rear chain sprockets will be provided in the usual way. A conventional caliper type brake 22 may be provided acting on the front wheel, although it is preferably actuated in a manner to be described later.

An actuator 24 for the front and rear brakes will be described with reference to FIGS. 3, 4 and 8, a rear brake 26 will be described with reference to FIGS. 3-7, and lost motion means incorporated in the front chain wheel 18 will be described with reference to FIGS. 9-11.

The brake actuator 24 is of the general type described in my U.S. Pat. No. 4,199,046, and whilst the arrangement shown in FIG. 8 of the present application resembles that of FIG. 15 of my application Ser. No. 110,494 of Jan. 8, 1980, it should be understood that any of the embodiments of either my abovementioned patent or that application may be utilized in order to suit the particular bicycle design involved. Such an arrangement has the advantage that it can be applied to existing crankshaft and bottom bracket designs with only minimal modifications to these components, whilst the actuator clutch is in a protected location within the housing 12. Thus the centre portion of the crankshaft is enlarged and machined to provide a suitable smooth cylindrical surface 27 within the housing if such a surface is not already provided, and a slot 28 is cut in the bottom of the housing. The actuator comprises a coil spring 30 of special design and a yoke 32. The spring 30 has a central bight 34 and two oppositely handed coils 36, whose outward portions 38 are of wire of smaller cross section. The two outside turns of portions 38 have a slightly smaller internal diameter so that only these turns normally contact the surface 27. The wire of coils 36 is preferably of rectangular cross-section to increase both its cross sectional area for a given axial length of coil and the area of its surface adjacent the surface 27. Upon forward rotation of the crankshaft, the outside turns of portions 38 drag lightly on the surface 27, but the drag tends to uncoil these portions so as to minimize friction. Reverse rotation of the crankshaft on the other hand tightens the coil portions 38, which in turn tighten the whole coils 36 so as to clamp the spring to the surface 27 and cause the bight 34 to move the yoke 32 with the crankshaft, one end of the yoke engaging the bight and the other a combined bearing plate and seal 40 surrounding the stem of the yoke 32. The use of the smaller section outer portions 38 permits a compact spring exercising minimum drag on the crankshaft during normal operation whilst permitting the inner portions to be strong enough to resist even panic braking forces.

Figures 3, 4:
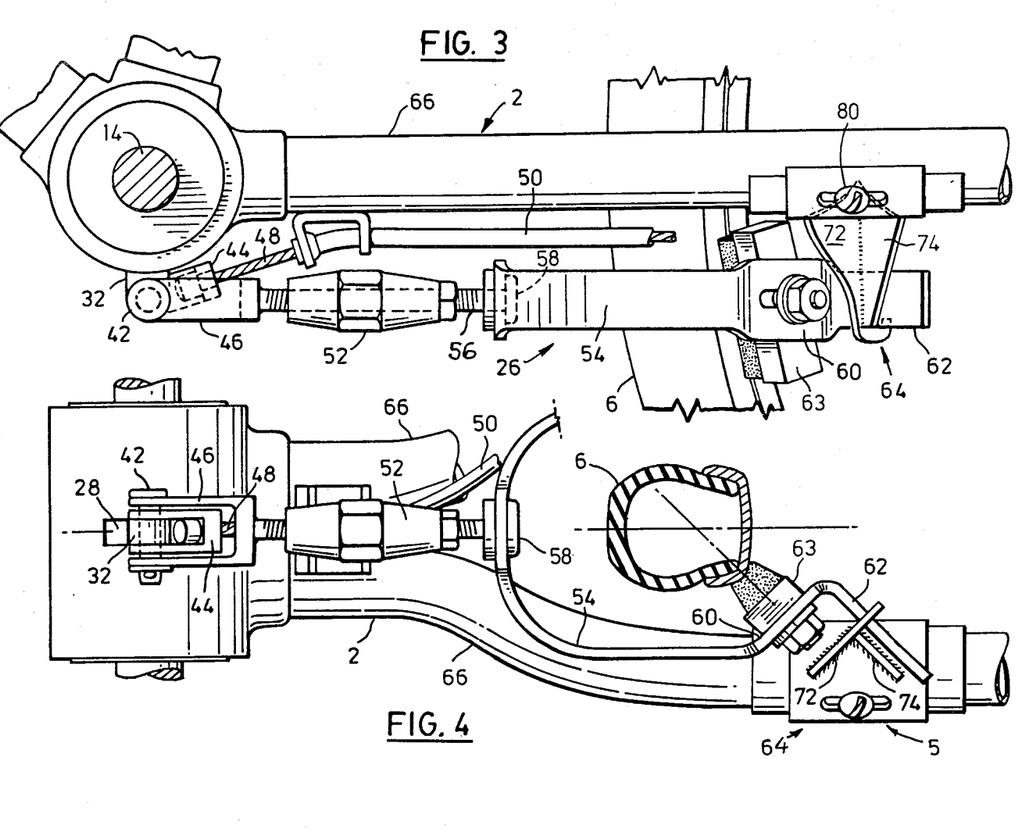
FIG. 3 is an enlarged detail showing a side elevation of a portion of either one of the bicycles of FIGS. 1 and 2, including the pedal crankshaft and part of the rear wheel rim, the chain drive and associated parts not being shown.
FIG. 4 is an underside plan view of the same portion as is shown in FIG. 3.

As seen in FIGS. 3 and 4, the yoke 32 is coupled by a clevis pin 42 to first and second clevises 44 and 46. The clevis 44 is coupled to the inner core 48 of a cable 50 which operates the front brake 22. The clevis 46 is coupled by a turnbuckle 52 to the rear brake 26. Since the rear brake is coupled very directly to the actuator, whilst the front brake is coupled by a fairly lengthy cable, the elasticity inherent in the latter will automatically limit the braking effort applied to the front brake relative to the rear brake, thus promoting safe two wheel braking. It should be understood that whilst this mode of actuating the front brake is considered advantageous, conventional operation of the front brake by means of a handlebar mounted lever may be substituted without affecting operation of the rear brake, or even provided in addition to the crankshaft operated actuator described. It should also be appreciated that failure of either brake will not affect operation of the remaining brake provided that the actuator remains operative.

The rear brake itself comprises a stirrup 54 of strip steel, having its major cross-sectional dimension perpendicular to the plane of the stirrup. The stirrup is generally U-shaped, the crown of the U being connected by a threaded rod 56 to the turnbuckle 52 through a suitable coupling 58 designed to avoid excessive stress concentration at this point. The distal portions of the arms of the U are angled first inwardly at portions 60 then outwardly at portions 62, each angle being at about 45° to the plane of the rear wheel 6. Brake shoes 63 are bolted to the portions 60, both these portions and the crown of U being broadened to compensate for the fastening apertures provided therein. The stirrup is suitably heat-treated to render it strongly resilient, with a free profile essentially as shown by the chain-dotted line in FIG. 7.

The stirrup is located relative to the rim of the wheel by a three point supporting system comprising the clevis pin 42 acting as a pivotal support through the turnbuckle 52, and support brackets 64 secured the rear forks 66 of the frame 2 and engaging the portions 62. The support brackets provide an abutment surface 68 for the portions 62 against which they are pressed by the resilience of the stirrup, and retaining hooks 70 prevent downward movement of the portions 62 out of engagement with the brackets. The brackets each comprise a plate 72 sustaining the abutment forces, stiffened by a plate 74, and supported by a semicylindrical clasp plate 76 slidable longitudinally on a semicylindrical mounting plate 78 secured to each fork 66. The longitudinal position of the bracket is fixed after adjustment by a screw 80. The turnbuckle 52 and the brackets 64 are adjusted so that with the actuator 24 released the brake shoes 63 just fail to contact the corners of the rim of the wheel 6. Subsequent adjustment to take up wear may be carried out using the turnbuckle alone. Should it be desired to remove the rear wheel, the portions 62 may, after loosening turnbuckle 52 if necessary, be moved upward and pressed inwards to release them from the brackets 64, and the stirrup then pivoted downwardly about the clevis pin 42 so as to clear the wheel. After re-installation of the wheel, the reverse operation restores operation of the brake. The brackets 64 allow a significant degree of upward pivotal movement of the brake shoes about the clevis pin 42 in a direction substantially tangential to the wheel rim.

Figures 9, 10, 11:
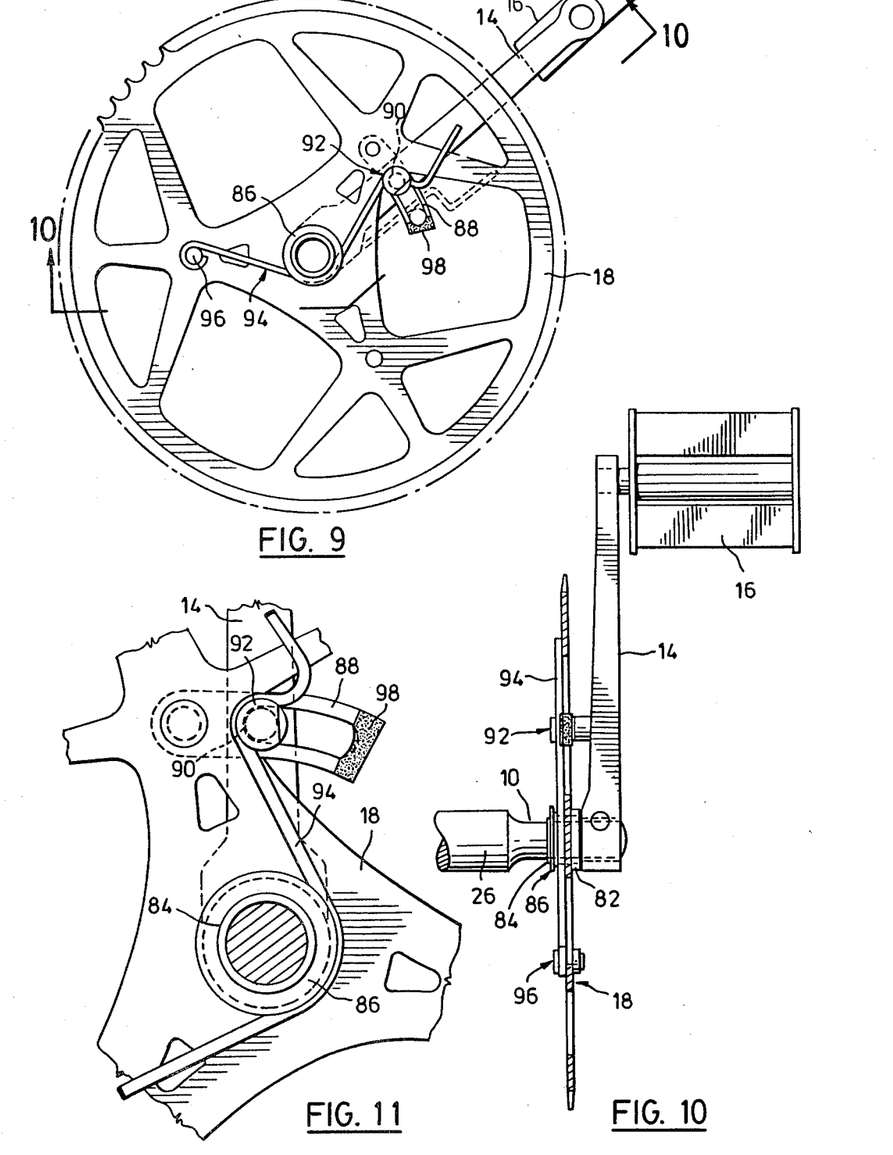
FIG. 9 illustrates in side elevation from the inner side an exemplary embodiment of chain wheel incorporating lost motion means.
FIG. 10 illustrates the chain wheel in section on the line 10—10 in FIG. 4.
FIG. 11 is a detail from an enlarged scale of the lost motion means shown in FIG. 9.

Referring now to FIGS. 9 to 11, it will be noted that instead of the front chain wheel 18 being fixed for rotation with the pedal crankshaft 10 and pedal cranks 14, it is mounted on a hub 82 journalled on a bushing 84 on which it is retained by a washer 86 so that it may move on the crankshaft to the extent permitted by a slotted link 88 connected to the chain wheel, a neck 90 of an engagement pin 92 on the pedal crank 14 engaging the slot in the link. Typically the slot allows about 20° of relative movement between the chain wheel and the crankshaft, and although this movement may be varied to suit the brake actuator used, it is preferably not much greater than the minimum angular movement required to assure substantial release of the brake actuator. Movement of the pin in the slot is controlled by a spring 94 acting between the chain wheel and the crankshaft. In the example shown, one end of the spring is enchored by a pin 96 secured to the chain wheel, and the other end engages the neck 90 of the pin 92 on the pedal crank, having passed around the hub 82 intermediately. The spring is calibrated so that the pressure it exerts when the pin is at the end 98 of the slot, with the spring in the position shown in broken lines in FIG. 9, is much less than when the pin is at the other end of the slot (as shown in full lines in FIG. 9) with a progressive increase in between. The pressure required on the pedal cranks 14 against the resistance of the chain wheel in order to move the pin and spring to the position shown in FIG. 9 in full lines should be a substantial proportion of normal pedalling pressure.

In operation of the bicycle, forward pedalling will result in the pedalling torque being transmitted to the chain wheel, initially through the spring 94 until the torque is great enough to move the pin 92 to the position shown in full lines in FIG. 9 and thereafter directly. The pedalling torque is transmitted to the rear wheel in the usual way through the chain 20. Whenever the torque falls low enough, the spring 94 will take up the lost motion between the chain wheel 18 and the crankshaft and assume the position shown in broken lines in FIG. 9, but operation will be smooth because of the progressive nature of the spring and the relatively large bias it applies. Typically, about 10–15 foot pounds torque will be required to take up fully the lost motion, but only a small portion of that torque will be required to initiate take up. To reduce shocks and noise when pedalling torque ceases, the end 98 of the slot may be padded with resilient material.

When it is desired to brake the bicycle, the user backpedals, as on a conventional coaster brake. This operates the brake actuator in the manner already described, which causes the yoke 32 to draw the clevises 44 and 46 forwardly. The operation of the clevis 44 acting on the front brake has already been described. The clevis 46 draws the stirrup 54 of the rear brake 26 forward and substantially radially outwardly relative to the rear wheel 6. When this happens, the brackets 64 act as guides for the stirrup arms, and since the abutment of the arm portions 62 with the abutment surfaces 68 of the brackets produces a wedging engagement of the two parts, the radial movement of the stirrup 54 is translated into a calipar movement of the stirrup arm portions 60 which causes the brake shoes 63 to clasp opposite sides of the rim of the wheel 6 between them from perpendicular directions as a result of inward deflection of the arm portion 60. This action is quite different from that of the older type of stirrup brake. Although such brakes were often provided with guides for slightly angled posts on the stirrup arms, the purpose of these guides was merely to maintain the movement of the brake shoes perpendicular to the inner braking surfaces of the wheel rim, and no clasping or caliper braking action was generated as in the present case.

By means of the present invention, a very powerful caliper or clasping braking force can be applied to the rim of the wheel 6 through a mechanism which is sufficiently robust to withstand panic braking forces without any form of stress relief such as is provided by cable elasticity or by the insertion of spring loaded couplings as in the Orozco patent discussed above. Moreover, this powerful braking force is applied at the rim of the wheel, where it is required, rather than requiring to be transmitted through the wheel spokes as with in-hub or disc brakes which are the only presently generally available means of providing more effective braking than conventional caliper brakes.

Figure 7:
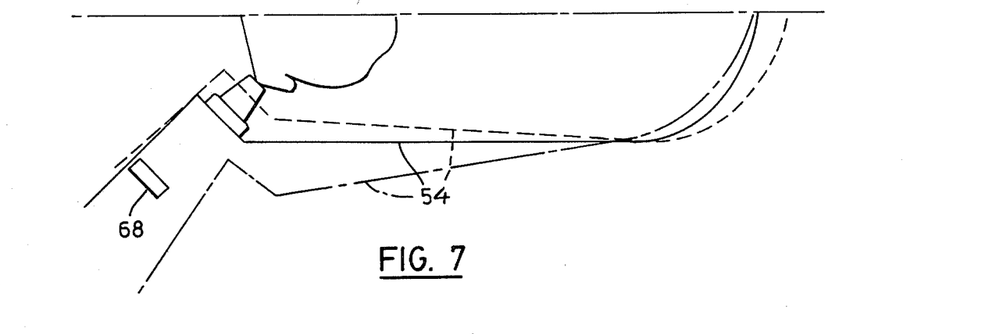
FIG. 7 is a diagram illustrating in solid chain and broken lines, normal, free, and maximally deflected positions of the brake stirrup.
Figure 8:
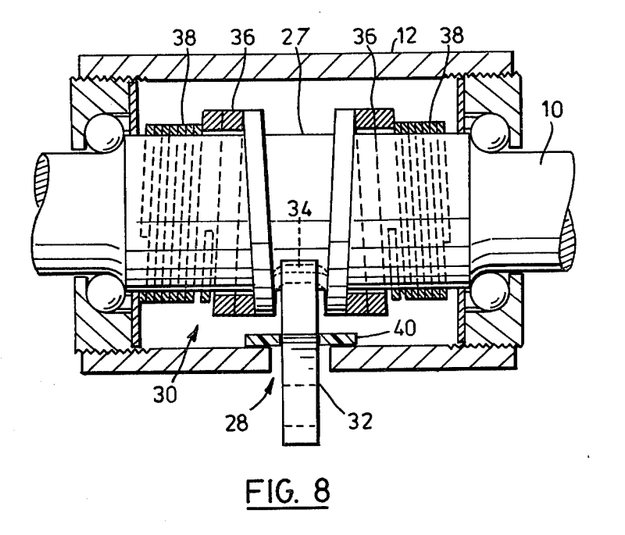
FIG. 8 is a lateral section through the bracket pedal crank housing of the bicycle.

The arm portions 62 are made sufficiently long to allow for full application of the brake, and for wear of the brake shoes 63, as shown by the broken line in FIG. 7. Upon forward pedalling, the brake actuator 24 is uncoupled from the pedal crankshaft 10 as already described. The resilience of the arms of the stirrup 54 acting through the portions 62 on the abutment surfaces 68 generates radially acting forces which then draw the stirrup rearwardly and approximately radially inwardly towards its initial position, thus releasing the brake and also because of the rigid linkage to the yoke 32, restoring the yoke to its initial position independently of any slight drag exerted by the clutch spring 32. This eliminates the need for the return spring usually required in hand brake actuators or caliper brakes to restore the mechanism on release of the brake.

If the bicycle is brought to a halt with the brakes firmly applied, it must be possible for the pedal crankshaft to move forward sufficiently to release the brake whilst the rear wheel is still immobile, since otherwise a locked-up condition can arise as described in the introduction of this specification. The lost motion connection between the chainwheel 18 and the pedal crankshaft 10 permits sufficient forward movement of the latter, all that is necessary to release the brakes being the application of sufficient pedal pressure to move the pin 92 far enough forward in the slotted link 88 to release the brakes. The progressive nature of the spring 94 and the graded release of the brake 6 act to prevent any undesirable desirable jerk upon starting from a standstill after a brake application.

Another type of lock-up is that which occurs on wheeling the bicycle rearwardly, since the rearward motion of the wheel 6 will be transmitted through the chain 20 to the chain wheel 18, and thence to the pedal crankshaft, resulting in operation of the brake actuator and application of the brakes. With previous crankshaft operated brake actuators, it has been necessary for the user of the bicycle to jerk the machine sharply forward with the rear wheel on the ground in order to release the brake, or alternatively in the chain drive. I have found that the undesirable features of this lock-up phenomenon can be overcome simply by providing for limited displacement of the brake shoes in a direction tangential to the wheel rim, such as is provided in the present case by making the abutment surface 68 of greater extent than the depth of the arm portions 62, so as to allow about a centimeter of free play. When the brake is applied by the bicycle being wheeled rearwardly, the arm portions 62 ride up the surfaces 68, making the free play available when the bicycle is wheeled forwardly to release the tension in the chain. I find that this is sufficient to greatly facilitate release of the brake. With the lock-up problem thus overcome, the application of the brake upon rearward movement of the bicycle actually becomes an advantage, since it facilitates parking of the bicycle. With the brake structure described, the three-point support of the brake by the clevis pin 42 and the brackets 64 not only provides a very satisfactory way of sustaining braking reaction forces without overstressing the brake structure, but also makes it easy to provide the desired tangential free movement of the brake shoes. This same tangential free movement also provides the means for quick release of the brake mechanism from the wheel as already described.

A particular advantage of the brake system of the invention is that it permits the use of friction materials of improved performance in the brake shoes 63. Bicycle brake shoe materials have customarily been selected from those having high coefficients of friction, so as to reduce the braking effort required. Unfortunately, the performance of such materials is generally very seriously adversely affected by contaminants such as oil, grease and particularly water. Although materials of improved performance have been introduced from time to time, the problem has by no means been entirely solved. The much higher braking effort which can be applied with the brake of the invention makes it possible to obtain effective braking from materials which have a lower coefficient of friction when dry but are less affected by the presence of water or oil films on the wheel rim, thus providing much more consistent brake performance.

The embodiments of the invention in which an exclusive property or privilege is claimed are defined as follows:

1. A bicycle including a frame, a pedal crankshaft journalled in the frame, a chain drive connecting the pedal crankshaft to a rear wheel, a back pedal brake system comprising a rear wheel brake supported by the frame, a progressive brake actuator connected to the brake and means establishing an operative coupling between the pedal crankshaft and the brake actuator, bidirectional lost motion means incorporated into the chain drive independent of said coupling means, the degree of lost motion being such as to allow sufficient forward motion of the cranksahft independent of the rear wheel to permit full and mormal release of the brake whilst maintaining establishment of said coupling, and means biasing the lost motion means to a condition in which the rearward lost motion is taken up and said forward lost motion is available, said biasing means being a spring providing a highly progressive bias as said forward lost motion is taken up, the forward torque required to be applied to the pedal crankshaft fully to take up said bias being a substantial porportion of normal pedalling torque and substantially greater than that required to commence taking up the bias.

2. A bicycle according to claim 1, wherein the coupling mears is a wire spring surrounding the pedal crankshaft within a frame bracket in which the crankshaft is journalled, the spring having a central bight engaging a yoke forming part of the actuator extending through an opening in the bracket, and two oppositely handed coils extending from the bight around the crankshaft in a winding direction to the normal pedalling direction, the portions of the coils further from the bight being of wire of reduced cross section, and only these portions of the coils normally contacting the crankshaft.

3. A bicycle according to claim 2, wherein the brake actuator further includes a rigid link connecting the brake to the yoke.

4. A bicycle according to claim 1 or 2, wherein the brake is a rim brake of the clamp type having a stirrup with stirrup arms, brake shoes carried by the stirrup arms, and separate guides for each stirrup arm, said guides being supported by the frame adjacent each of the brake shoes whereby to transmit braking forces thereto, and a yoke portion of said stirrup being further supported for the transmission of braking forces to the frame at a point radially outward of the stirrup, the stirrup arms being resiliently deflectable towards one another in the plane of the stirrup, and the guides and arms being in wedging engagement whereby to translate radial movements of the stirrup relative to the rim of the rear wheel into caliper movements of the stirrup arms such that outward movement of the stirrup relative to the guides from a rest position results in deflection of the arms towards one another, and resilient return movement of the arms away from one another results in radially inward movement of the stirrup to said rest position, the brake shoes being mounted on the arms so as to engage the rim from substantially perpendicular directions whereby to engage opposite inside edges of the rim between them upon deflection of the arms towards one another.

5. A bicycle according to claim 4, wherein the stirrup is formed in one piece from resilient strip material having its major cross-sectional dimension perpendicular to the plane of the stirrup.

6. A bicycle according to claim 5, wherein the guides for the stirrup arms permit limited displacement of the stirrup in a direction substantially tangential to the wheel rim.

7. A bicycle according to claim 5, wherein the guides include means mounting them on rear forks of the the bicycle frame, and the mounting means include means permitting longitudinal adjustment of the position of the guides relative to the forks, wherein the guides each include an abutment surface in wedging engagement with a portion of a stirrup arm, that portion of the stirrup arm being angled outwardly relative to the plane of the rear wheel, at about 45° and wherein a further portion of each stirrup arm adjacent that portion engaging the associated guide is angled inwardly relative to the plane of the wheel at about 45°, the brake shoes being carried by these further portions of the stirrup arms.

8. A bicycle according to claim 3, further including a front caliper brake and an actuating cable for said front brake, wherein the actuating cable is also connected to the yoke and has sufficient elasticity to limit the braking effort applied to the front brake relative to that applied to the rear brake.

9. A bicycle according to claim 8, wherein the rear brake is a rim brake of the clasp type having a stirrup with stirrup arms, brake shoes carried by the stirrup arms, and separate guides for each stirrup arm, said guides being supported by the frame adjacent each of the brake shoes whereby to transmit braking forces thereto, and a yoke portion of said stirrup being further supported for the transmission of braking forces to the frame at a point radially outward of the stirrup, the stirrup arms being resiliently deflectable towards one another in the plane of the stirrup, and the guides and arms being in wedging engagement whereby to translate radial movements of the stirrup relative to the rim of the rear wheel into caliper movements of the stirrup arms such that outward movement of the stirrup relative to the guides from a rest position results in deflection of the arms towards one another, and resilient return movement of the arms away from one another results in radially inward movement of the stirrup to said rest position, the brake shoes being mounted on the arms so as to engage the frim from substantially perpendicular directions whereby to engage opposite inside edges of the rim between them upon deflection of the arms towards one another.

10. A bicycle according to claim 9, wherein the stirrup is formed in one piece from resilient strip material having its major cross-sectional dimension perpendicular to the plane of the stirrup, wherein the guides include means mounting them on rear forks of the bicycle frame, and the mounting means include means permitting longitudinal adjustment of the position of the guides relative to the forks, wherein the guides each include an abutment surface in wedging engagement with a portion of a stirrup arm, that portion of the stirrup arm being angled outwardly relative to the plane of the rear wheel at about 45°, and wherein a further portion of each stirrup arm adjacent that portion engaging the associated guide is angled inwardly relative to the plane of the wheel at about 45°, the brake shoes being carried by these further portions of the stirrup arms.

11. A rim brake for a bicycle, of the clasp type having atirrup with stirrup arms, brake shoes carried by the stirrup arms, and separate guides for each stirrup arm, said guides being configures to be supported by a frame of the bicycle adjacent each of the brake shoes whereby to transmit braking forces thereto, and a yoke portion of said stirrup being further supported for the transmission of braking forces to the frame at a point radially outward of the stirrup, wherein the stirrup arms are resiliently deflectable towards one another in the plane of the stirrup, and the guides and arms are in wedging engagement whereby to translate radial movements of the stirrup relative to the rim of a wheel to which the brake is applied in caliper movements of the stirrup arms such that outward movement of the stirrup relative to the guides from a rest position results in deflection of the arms towards one another, and resilient return movement of the arms away from one another results in radially inward movement of the stirrup to said rest position, the brake shoes being mounted on the arms so as to engage the rim from substantially perpendicular directions whereby to engage opposite inside edges of the rim between them upon deflection of the arms towards one another.

12. A bicycle brake according to claim 11, wherein the stirrup is formed in one piece from resilient strip material having its major cross-sectional dimension perpendicular to the plane of the stirrup.

13. A bicycle brake according to claim 11 or 12, wherein the guides for the stirrup arms permit limited displacement of the stirrup in a direction substantially tangential to the wheel rim.

14. A bicycle brake according to claim 12, wherein the brake is a rear brake, the guides include means for mounting them on the rear forks of a bicycle to which the brake is applied, and the mounting means include means permitting longitudinal adjustment of the position of the guides relative to the forks.

15. A bicycle brake according to claim 12, wherein the guides each include an abutment surface in wedging engagement with a portion of a stirrup arm, that portion of the stirrup arm being angled outwardly relative to the plane of a wheel to be braked at about 45°.

16. A bicycle brake according to claim 15, wherein a further portion of each stirrup arm adjacent that portion engaging the associated guide is angled inwardly relative to the plane of the wheel at about 45°, the brake shoes being carried by these further portions of the stirrup arms.

* * * * *

UNITED STATES PATENT AND TRADEMARK OFFICE
CERTIFICATE OF CORRECTION

PATENT NO. : 4,462,488
DATED : July 31, 1984
INVENTOR(S) : WINNETT BOYD

Figure 5:
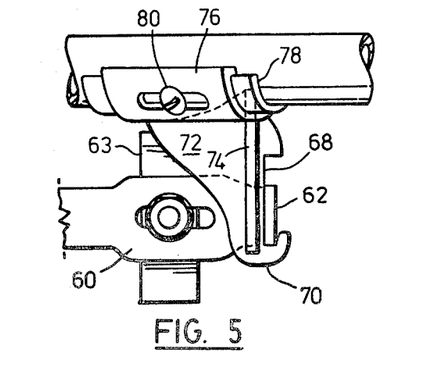
FIG. 5 is a detail view from the direction of arrows 5 in FIG. 4.
Figure 6:
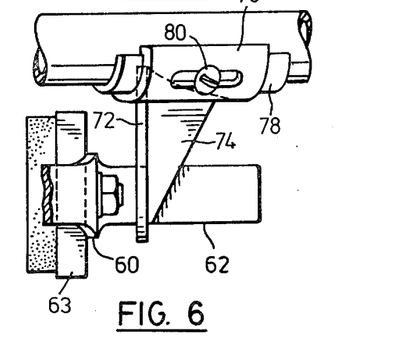
FIG. 6 is a detail view from the direction of arrow 6 in FIG. 4.

It is certified that error appears in the above-identified patent and that said Letters Patent are hereby corrected as shown below:

In Figure 4 of the drawings, the arrow 5 should extend straight, and parallel to the plate 74, in order to indicate the direction of view in Figure 5. Also in Figure 4, a straight arrow 6 should be inserted adjacent the reference numeral 64, pointing towards the plate 74 and extending parallel to the plate 72, in order to indicate the direction of view in Figure 6.

Signed and Sealed this

Twenty-sixth Day of February 1985

[SEAL]

Attest:

DONALD J. QUIGG

Attesting Officer

Acting Commissioner of Patents and Trademarks